United States Patent
Cagle et al.

(10) Patent No.: US 8,926,781 B2
(45) Date of Patent: Jan. 6, 2015

(54) SYSTEM AND METHOD OF MANUFACTURING A COMPOSITE CANDLE WICK

(71) Applicant: The Yankee Candle Company, Inc., So. Deerfield, MA (US)

(72) Inventors: John E. Cagle, South Deerfield, MA (US); Robert W. Brown, Palmer, MA (US)

(73) Assignee: The Yankee Candle Company, Inc., Deerfield, MA (US)

( * ) Notice: Subject to any disclaimer, the term of this patent is extended or adjusted under 35 U.S.C. 154(b) by 0 days.

(21) Appl. No.: 13/670,891

(22) Filed: Nov. 7, 2012

(65) Prior Publication Data

US 2013/0112346 A1 May 9, 2013

Related U.S. Application Data

(60) Provisional application No. 61/556,998, filed on Nov. 8, 2011.

(51) Int. Cl.

| | |
|---|---|
| *B32B 37/10* | (2006.01) |
| *B32B 27/12* | (2006.01) |
| *B32B 38/00* | (2006.01) |
| *B32B 21/08* | (2006.01) |
| *B32B 21/10* | (2006.01) |
| *B32B 37/04* | (2006.01) |
| *F23D 3/08* | (2006.01) |
| *B32B 37/20* | (2006.01) |
| *B32B 37/06* | (2006.01) |

(52) U.S. Cl.
CPC ............... *B32B 37/10* (2013.01); *B32B 27/12* (2013.01); *B32B 2262/062* (2013.01); *F23D 2900/03082* (2013.01); *B32B 38/0004* (2013.01); *B32B 2317/16* (2013.01); *B32B 21/08* (2013.01); *B32B 21/10* (2013.01); *B32B 2317/10* (2013.01); *B32B 37/20* (2013.01); *B32B 37/04* (2013.01); *B32B 37/06* (2013.01); *F23D 3/08* (2013.01)
USPC ........... 156/269; 156/543; 156/499; 156/510; 156/60; 431/325

(58) Field of Classification Search
CPC ................................. F23D 3/08; B32B 21/10
USPC .................. 156/269, 543, 499, 510, 321, 60; 431/288, 298, 325
See application file for complete search history.

(56) References Cited

U.S. PATENT DOCUMENTS

| 373,496 A | 11/1887 | Sterns |
|---|---|---|
| 383,822 A | 5/1888 | Munger |

(Continued)

OTHER PUBLICATIONS

International Search Report and Written Opinion issued for PCT/US12/60404, dated Jan. 7, 2013 (7 pages).

(Continued)

*Primary Examiner* — Margaret Squalls
(74) *Attorney, Agent, or Firm* — Wilmer Cutler Pickering Hale and Dorr LLP

(57) ABSTRACT

The system and method for manufacturing the composite candle wick includes a mechanism for feeding the cotton wick and wood wick at substantially the same speeds. The wood wick is heated in order to cause a melting of a wax coating around the cotton wick and pressure is applied to the wick materials through a compression wheel and drive belt which carries the wick materials. Once the pressure is applied to form the composite wick the wicks are then sent through a cutting tube where a cutting blade will cut the wick to its desired length.

3 Claims, 6 Drawing Sheets

(56) References Cited

U.S. PATENT DOCUMENTS

| | | | |
|---|---|---|---|
| 2,758,460 A | 8/1956 | Ciano | |
| 2,829,511 A | 4/1958 | Oesterale et al. | |
| 3,428,409 A * | 2/1969 | Summers | 431/289 |
| 4,044,985 A | 8/1977 | Ghany | |
| 4,147,518 A * | 4/1979 | De Hart et al. | 44/636 |
| 4,381,914 A | 5/1983 | Ferguson | |
| 5,863,196 A | 1/1999 | Rockwell et al. | |
| 7,568,913 B2 | 8/2009 | Decker et al. | |
| D643,554 S | 8/2011 | Decker | |
| D644,359 S | 8/2011 | Decker | |
| 2003/0084605 A1 | 5/2003 | Mertz | |
| 2003/0235797 A1 | 12/2003 | McCullough et al. | |
| 2005/0037308 A1 * | 2/2005 | Decker | 431/325 |
| 2006/0172242 A1 | 8/2006 | Collard | |
| 2008/0153046 A1 * | 6/2008 | Delcotto et al. | 431/288 |
| 2011/0024945 A1 | 2/2011 | Decker | |
| 2011/0027735 A1 | 2/2011 | Decker | |
| 2011/0027736 A1 | 2/2011 | Decker | |
| 2011/0027737 A1 | 2/2011 | Decker | |

OTHER PUBLICATIONS

KosterKeunen, "Ceresin and Ozokerite Waxes," Wax Specification Page (1 page).

International Search Report and Written Opinion for corresponding International Appliacation No. PCT/US2012/063911, dated Jan. 22, 2013 (7 pages).

* cited by examiner

SYSTEM AND METHOD OF MANUFACTURING A COMPOSITE CANDLE WICK

RELATED APPLICATIONS

This application claims priority to U.S. Application No. 61/556,998, filed on Nov. 8, 2011, which is incorporated herein by reference.

BACKGROUND OF THE INVENTION

The present invention relates to a method of manufacturing a composite candle wick whereby two materials, preferably cotton and wood, are joined together by means of lamination. The composite wick provides improved flame height consistency in candles.

Candles with wood wicks, especially planar wood wicks, suffer from inconsistent flame heights during normal use. The inconsistency, regardless of the type of wood used, appears to be attributed to the natural variation of the wood itself. Whether due to geography, altitude, weather, age or processing, the inconsistency in flame height in wood wick candles is a significant detriment within the candle industry.

Inconsistency in flame heights may be considered a mark of low quality in terms of use-aesthetics and fragrance release performance. Unless designed otherwise, candles are expected to maintain reasonable flame height consistency. Inconsistency in flame heights is observed as low flames and high flames within one candle during its use or from candle to candle.

Candles with low flames produce poor use-aesthetics and reduced fragrance release and impact. For example, a traditional candle flame imparts a pleasant ambiance as exemplified by the well-known concept of "dinner by candlelight". Low flames will suffer from significantly reduced luminescence, producing undesirable candle flame ambiance. For scented candles, it is well known in the art that the flame melts the wax which results in fragrance release. Quick melting of the scented wax and the generation of a broad melt pool is conducive to maximizing both fragrance release and impact. Low flames lack the ability to readily melt the wax and may not form a broad melt pool, thus inhibiting fragrance release and impact. Candles with high flames are likely to produce excessive smoking and generate high heat.

To solve these problems a composite wood/cotton wick has been developed in which the cotton is adhered to the wood. Such a wick is described in U.S. patent application Ser. No. 13/274,630, the teachings of which are incorporated herein by reference. After lamination, the composite wick that comprises both the cotton wick and wood wick should be the same length, and the actual length will depend upon the height of the candle in which the wick is used.

It is an important aspect of this invention that both the cotton wick 3 and wood wick 3 be adhered together so that the final laminated composite wick can withstand additional manufacturing processes without becoming delaminated. Additional manufacturing processes include wick clip application to form a complete wick clip assembly, container placement and subsequent adhesion, candle forming such as hot liquid filling, and composite wick trimming for optimal first candle burn user experience. Another important aspect of this invention is that the planar cotton wick 3 not extend beyond the edges of the wood wick.

SUMMARY OF THE INVENTION

The system and method for manufacturing the composite candle wick includes a mechanism for feeding the cotton wick and wood wick at substantially the same speeds. The wood wick is heated in order to cause a melting of a wax coating around the cotton wick and pressure is applied to the wick materials through a compression wheel and drive belt which carries the wick materials. Once the pressure is applied to form the composite wick the wicks are then sent through a cutting tube where a cutting blade will cut the wick to its desired length.

These and other features and functions of the present invention will be more fully understood from the following detailed description which should be read in light of the accompanying drawings in which corresponding reference numerals refer to corresponding parts throughout the several views.

DETAILED DESCRIPTION OF PREFERRED EMBODIMENTS

Figure 1:
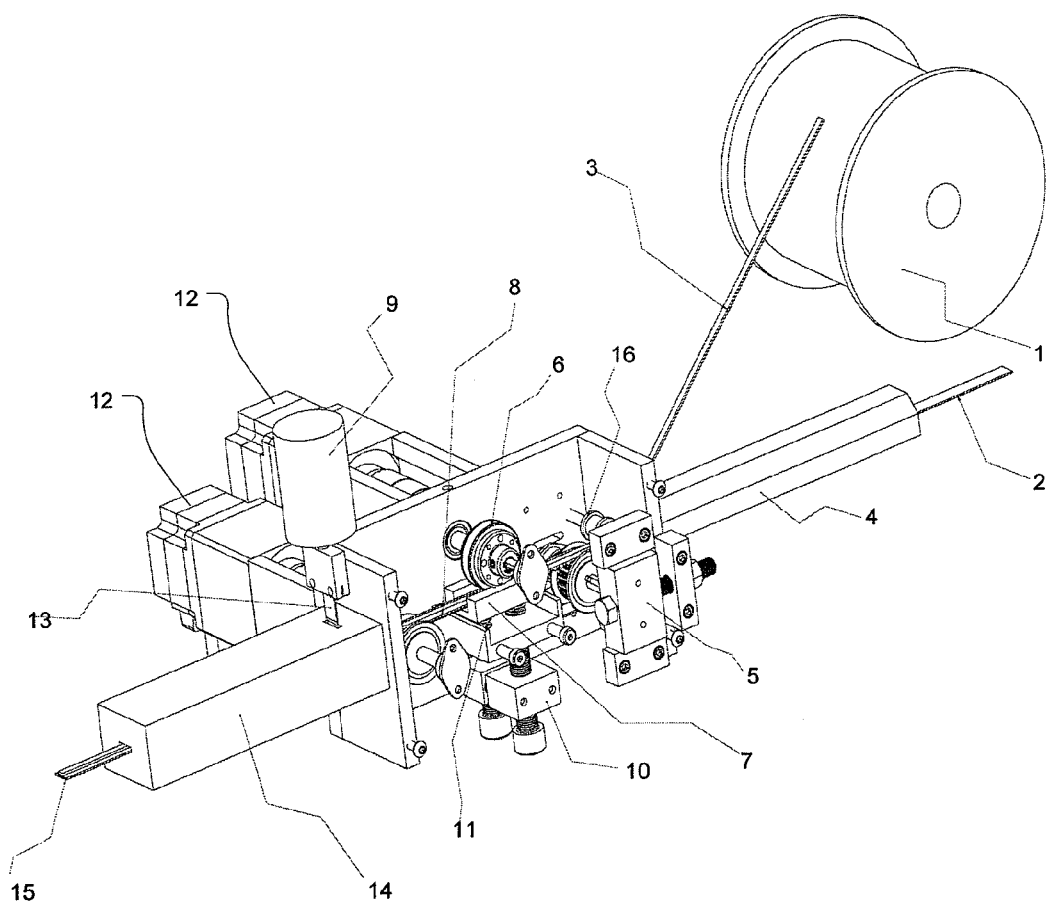
FIG. 1 is a schematic showing the perspective view of the system of the present invention for manufacturing a composite wick.
Figure 2:
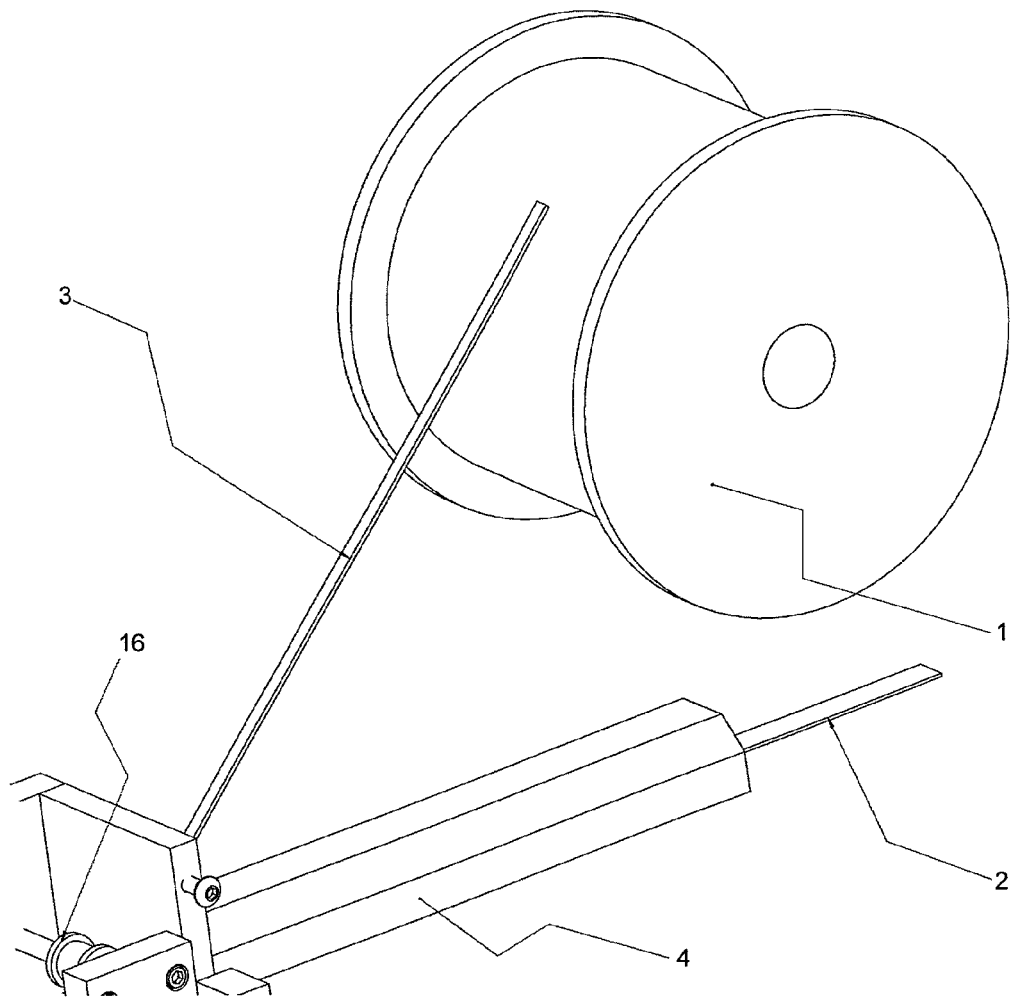
FIG. 2 is a schematic of the cotton wick and wood plank feed section of the system shown in FIG. 1.
Figure 3:
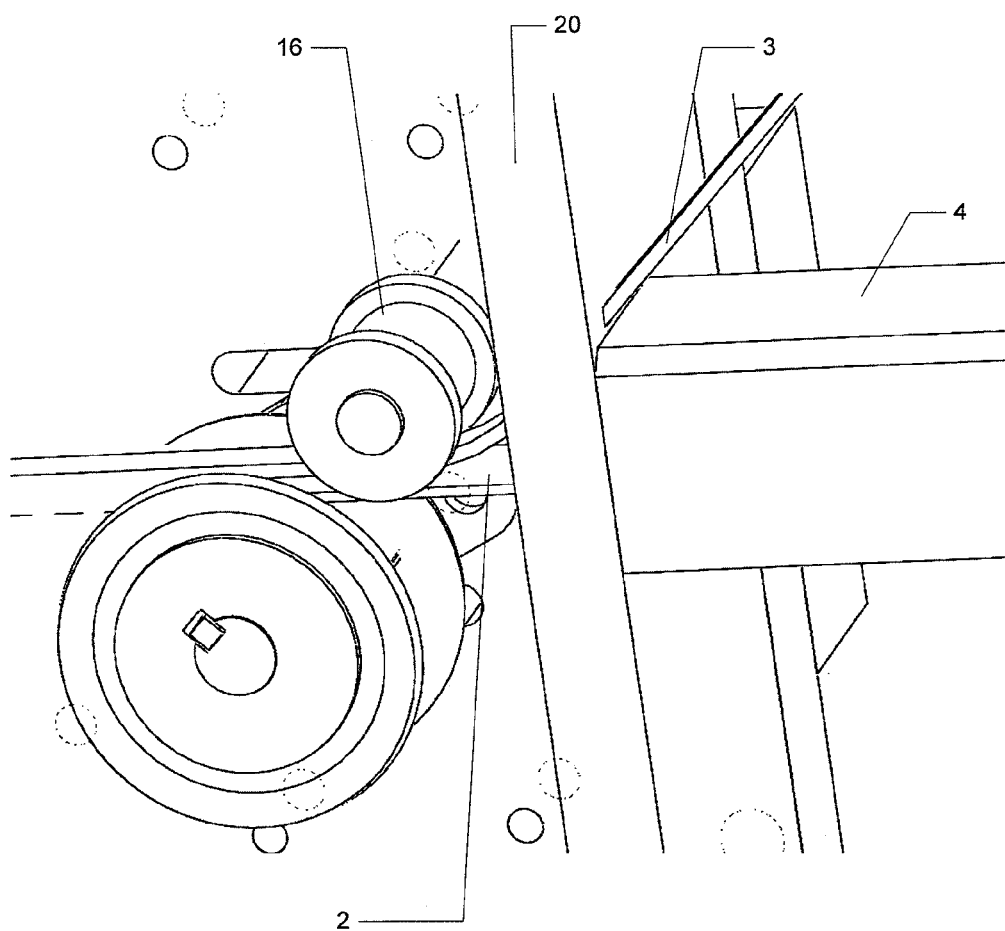
FIG. 3 is a close-up schematic of the cotton wick and wood wick feed section of the system shown in FIG. 1.
Figure 4:
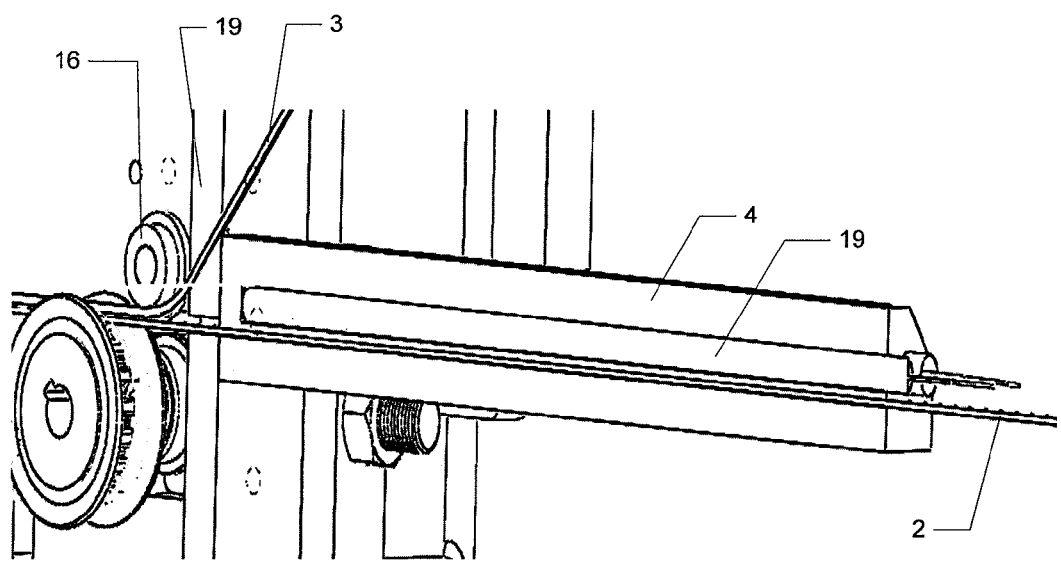
FIG. 4 is a cut-away schematic of the wood plank heating tube of the system shown in FIG. 1.

In the present invention, a fabric wick 3 and a wood plank 2 are combined by means of lamination to form a composite wick 15 of various lengths. It is preferred that the fabric wick 3 material be planar in geometry, but the fabric wick 3 may be in the shape of a rod, rectangle, or some other geometry. The fabric wick utilized in the present invention is preferably a braided wick having a flat geometry (planar) manufactured using one or more of the following materials: cotton (short and longer fiber), paper, rayon and cellulose. The fabric wick 3 may include multiple cotton cores braided together by multiple braids containing a rayon sleeve of one or more multiple fiber ends. As cotton is the preferred material for the fabric wick 3, the wick will be referred to hereafter as a cotton wick. The cotton wick 3 has a preferred thickness of between 0.025 inches and 0.065 inches and a preferred width of between 0.25 inches and 0.75 inches. The cotton wick 3 is wax coated and supplied on cotton wick spools in lengths of 10 to 1000 feet. Such wicks can be obtained from Atkins and Pearce, 1 Braidway, Covington, Ky. 41017.

It is preferred that the wood wick 2 be made out of the hardwood cherry, but other wood types may be used, such as the hardwoods maple and oak. In addition to hardwoods, softwoods such as pine or cedar may be used. The wood wick 2 is formed in a planar shape called a wood plank with a preferred thickness between 0.015 inch and 0.04 inch, a preferred width of between 0.25 inch and 1 inch, and length of between 3 inches and 36 inches, with a preferred length of 28 inches. Such wood wicks can be obtained from Candle Art, LLC, 10084 North 1950th Street, Dieterich, Ill. 62424.

The cotton wick 3 is wax coated as part of the post processing of the wick 3. The wax coating includes materials with adhesive qualities such as microcrystalline wax, high-melt paraffin wax, polyethylene wax, poly alpha olefins, or some other material that is used for traditional wick wax coatings. This wax coating functions as the binding agent in the lamination process described below. After lamination, the composite wick that comprises both the cotton wick and wood wick would be the same length, and the actual length will depend upon the height of the candle in which the wick is used.

The cotton wick 3 is supplied on a cotton wick spool 1 wound in lengths of ten to one thousand feet of continuous cotton wick 3 lengths. The wood plank 2 is supplied in 28" lengths and manually feed into the opening of the wood plank heating tube 4.

Referring to FIGS. 1-4, the cotton wick 3 supplied by a cotton wick spool 1 is guided by the cotton wick guide wheel 16 through the aluminum frame 20 at a feed rate equal to that of the wood plank 2 feed rate. The wood plank heating tube 4 heats the wood plank 2 to a temperature of between 120° F.-190° F. by a radiant heater 19 positioned from ¼" above to full contact with the wood plank 2. The heating of the wood plank 2 is an important aspect of this invention as it accounts for the subsequent slight melting of the lamination wax on the cotton wick 3.

Figure 5:
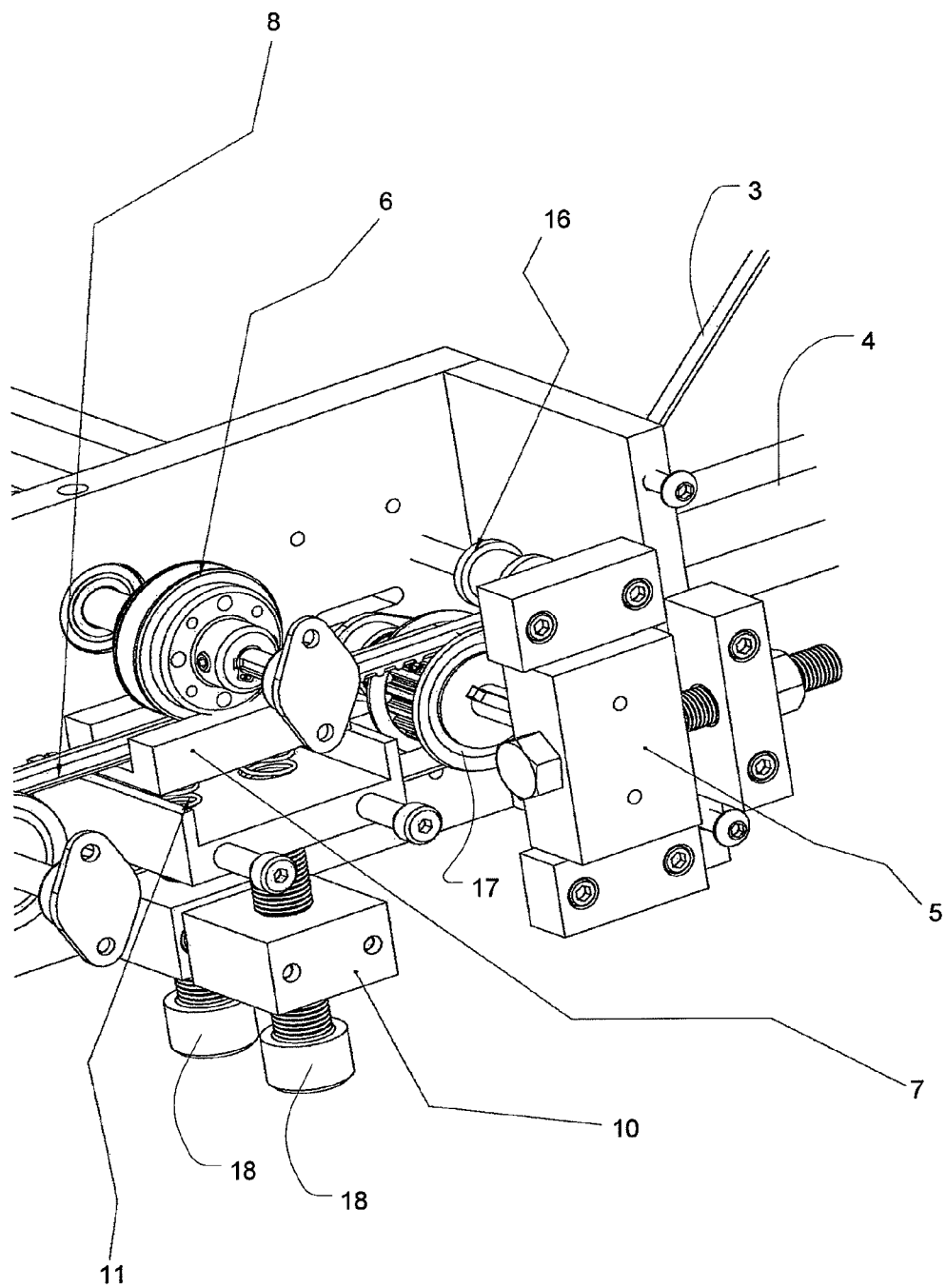
FIG. 5 is a schematic of the lamination section of the system shown in FIG. 1.

Referring to FIG. 5, the cotton wick 3 is guided to the compression wheel 6 via the cotton wick guide 16 and the wood plank 2 is guided to the compression wheel 6 through the wood plank heating tube 4 by the drive belt 8. The drive belt 8 is held taught by an adjustable belt tensioning assembly 5. The drive belt 8 is put in motion by a DC motor that turns a drive belt pulley 17. The compression wheel 6 is made of hard polyurethane with a Shore A hardness of at least durometer 95. The drive belt 8 rests on the drive belt support plate 7. The cotton wick 3 is guided onto the center of the wood plank 2, both of which are fed at the same rate into the compression wheel 6. The compression force of the compression wheel 6 can be adjusted by turning the tensioner screws 18. The tensioner screws 18 as part of the belt support tensioner system 10 increase or decrease the pressure on the belt support springs 11 which in turn increase or decrease the pressure on the belt support plate 7. Lamination of the composite wick 15 occurs as a function of pressure between the compression wheel 6 and the belt support plate 7 as applied to the two wick materials. As described above, the wood plank 2 is heated which causes melting of the wax coating on the cotton wick which causes the cotton wick 3 to adhere to the wood wick 2 when pressure is applied to the two wicks 2, 3. A manual adjustment to the tensioner screws 18 allows for optimal pressure on the cotton wick 3 and wood plank 2. Optimal pressure is determined by an off-line qualitative measure of the force required to separate the laminated pieces.

Figure 6:
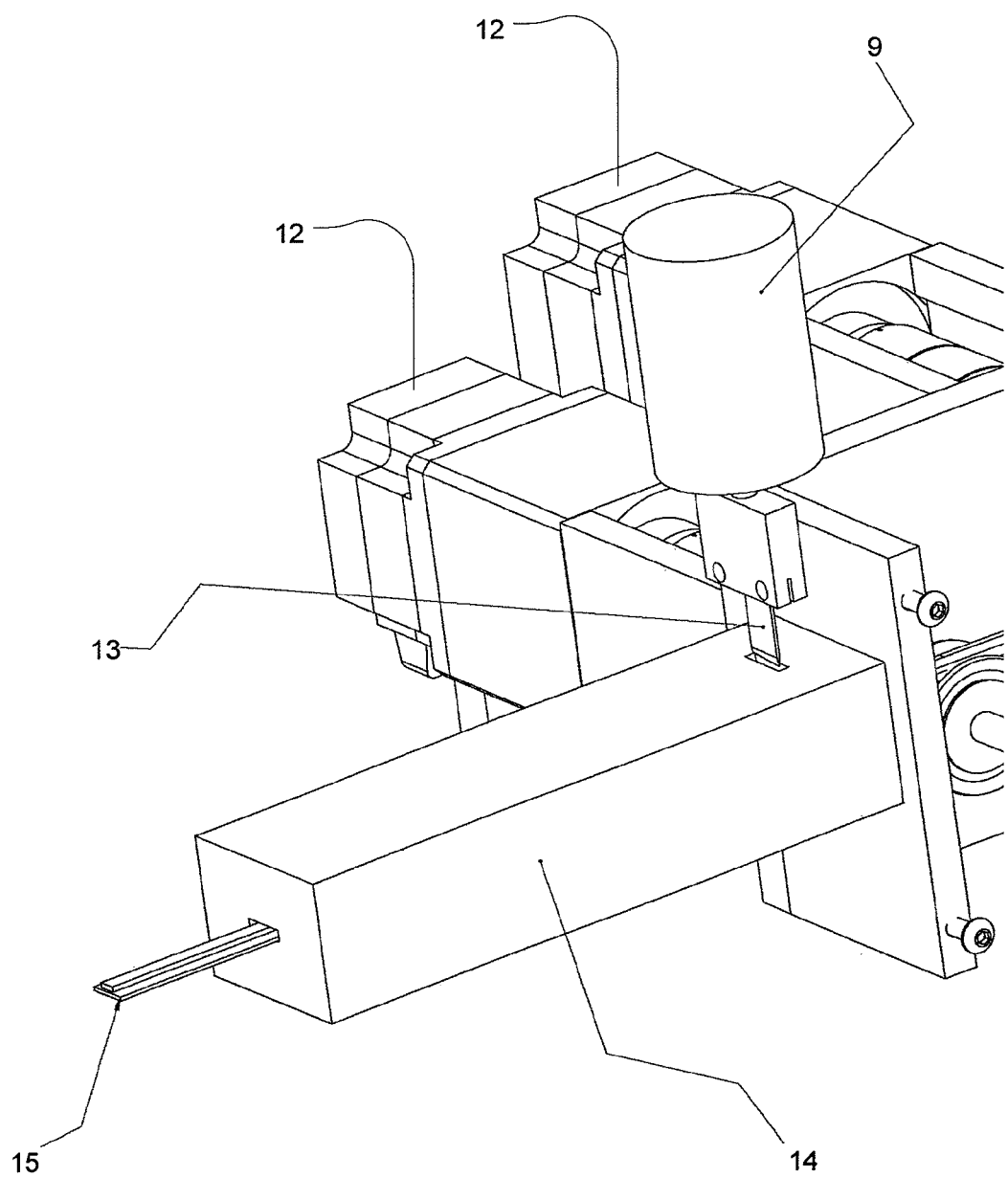
FIG. 6 is a schematic of the sizing and cutting section of the system shown in FIG. 1.

Referring to FIG. 6, both the cotton wick 3 and the wood plank 2 have equal feed rates governed by synchronized stepper motors 12. The wax coating on the cotton wick 3 is the lamination medium that binds together the cotton wick 3 and the wood plank 2. The now laminated cotton wick 3 and wood plank 2 progress as a composite wick 15 into the cutting tube 14. The cutting assembly 9 is engaged and the cutting blade 13 cuts the composite wick 15 as a function of the composite wick's 15 feed rate. The cutting assembly 9 engagement may be programmed to adjust the cut length to fit a variety of candle heights. The composite wick 15 exits the cutting tube where it is subsequently taken up by a wick assembly and placement system.

While the foregoing invention has been described with reference to its preferred embodiments various alterations and modifications will occur to those skilled in the art. All such alterations and modifications are intended to fall within the scope of the appended claims.

What is claimed:

1. Method for manufacturing a composite candle wick comprising the steps of:
   heating a planar wood wick;
   positioning a fabric wick coated with a wax coating adjacent an exterior planar surface of said heated planar wood wick;
   applying pressure to said heated planar wood wick and said fabric wick to cause melting of said wax coating and adherence of said fabric wick to said heated planar wood wick.

2. The method for manufacturing composite candle wick of claim 1
   wherein said step of positioning comprises positioning said planar wood wick on a drive belt and depositing said fabric wick in a parallel fashion over said planar wood wick;
   wherein said applying pressure step comprises passing said planar wood wick and said fabric wick between a compression wheel and said drive belt to cause the adherence of said fabric wick to said planar wood wick.

3. The method for manufacturing composite candle wick of claim 1 further comprising cutting said composite candle wick into desired lengths.

* * * * *